Figure 1:
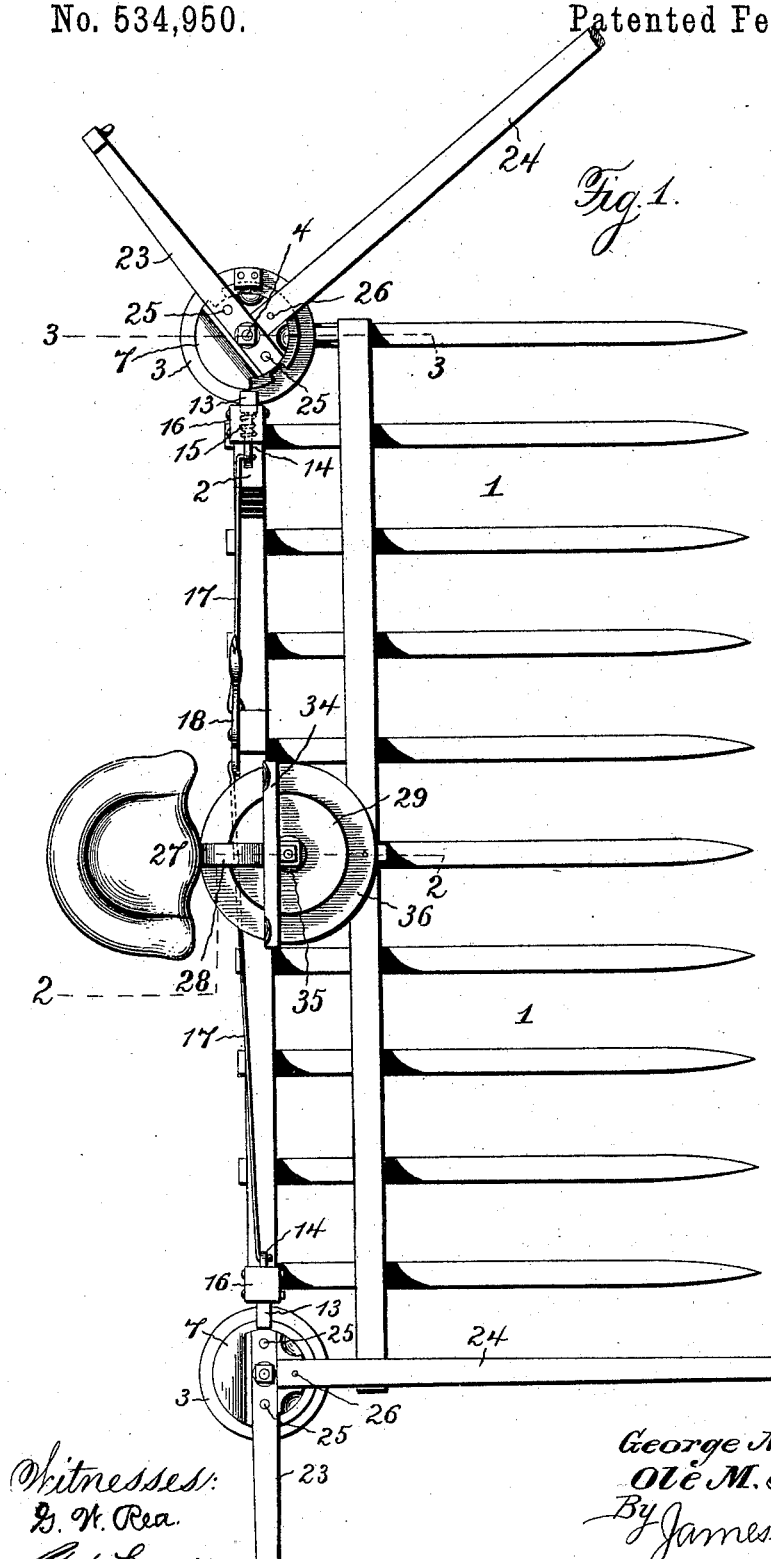

(No Model.) 2 Sheets—Sheet 1.

G. N. CARAWAY & O. M. J. RAMSEY.
HORSE RAKE.

No. 534,950. Patented Feb. 26, 1895.

Witnesses:
G. W. Rea.
Robert Ernett.

Inventors.
George N. Caraway.
Ole M. J. Ramsey.
By James L. Norris
Atty.

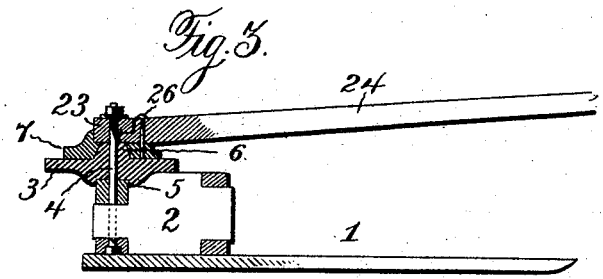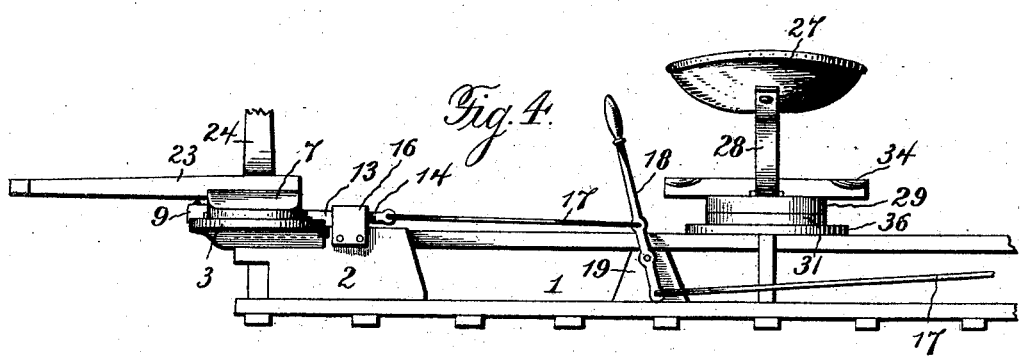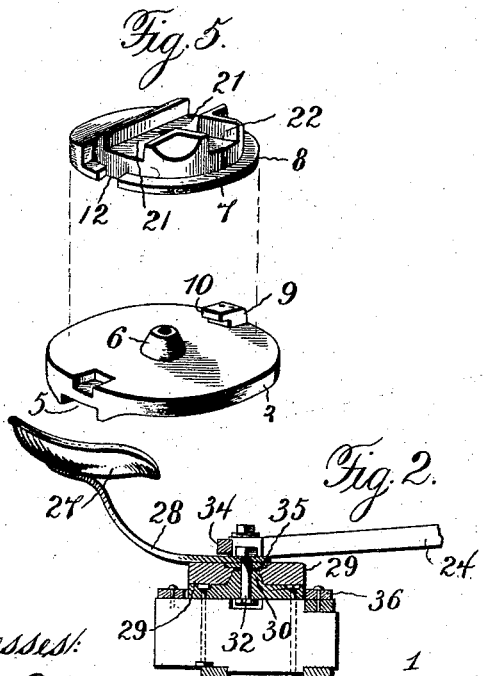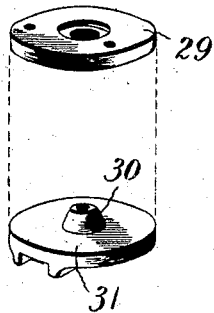

UNITED STATES PATENT OFFICE.

GEORGE N. CARAWAY AND OLE M. J. RAMSEY, OF GALLATIN, MISSOURI, ASSIGNORS TO THE ACME HARVESTER COMPANY, OF PEKIN, ILLINOIS.

HORSE-RAKE.

SPECIFICATION forming part of Letters Patent No. 534,950, dated February 26, 1895.

Application filed August 28, 1894. Serial No. 521,531. (No model.)

*To all whom it may concern:*

Be it known that we, GEORGE N. CARAWAY and OLE M. J. RAMSEY, citizens of the United States, residing at Gallatin, in the county of Daviess and State of Missouri, have invented new and useful Improvements in Horse-Rakes, of which the following is a specification.

Our invention relates to horse-rakes, our purpose being to provide a novel and simple construction and arrangement of parts whereby the rake may be drawn backward, to remove it from beneath an accumulation of hay, by the direct draft of the team, in contradistinction to backing up a sufficient distance to produce the same result. In other words, we aim to provide a horse-rake in which the tongues shall be capable of turning through half a circumference, bringing them into the same line of draft, but pointing in the opposite direction, the rake, meantime, remaining in its original position, so that when the horses are started the rake will be drawn backward, to remove its teeth from beneath the hay, or to enable it to pass over hay lying on the ground without collecting it. It is our purpose, also, to provide an attachment of simple construction and comprising but few parts, which shall be capable of being applied to horse-rakes of different patterns, as well as to both wheeled rakes and drag-rakes, the connection, or disconnection, being readily and quickly made by any person, thereby avoiding the expense of purchasing a complete rake, preserving the horses from the excessive fatigue of backing the rake and from lameness and injury of the back and shoulders frequently caused thereby, besides avoiding the constant trampling upon large masses of hay gathered by the rake.

Finally, one object of our invention is to provide a rake which may be drawn from beneath the hay, when arriving at the stacker, and by the retrograde movement of which the stacker may be operated to lift the hay brought by the rake and deposit it upon the stack.

The invention consists in the novel features of construction and new combinations of parts hereinafter fully described and then particularly pointed out and defined in the claims which follow this specification.

To enable others to fully understand and to make and use our said invention, we will proceed to describe the same in detail, reference being had, for this purpose, to the accompanying drawings, in which—

Figure 1, is a plan view of a horse-rake, showing our invention attached. Fig. 2, is a vertical transverse section on the line 2—2, Fig. 1. Fig. 3, is a similar section on the line 3—3, Fig. 1. Fig. 4, is a rear elevation of the same. Fig. 5, is a detail view of the base-plate and casting supporting the tongue and sweep. Fig. 6, is a similar detail of the parts supporting the seat.

The reference-numeral 1, in said drawings, indicates a horse-rake of any preferred pattern. The construction of the rake requires no specific description, as it is of any well known pattern.

Upon a bracket 2, at or near each end of the rake-frame, is rigidly mounted a disk-shaped base-plate 3, connected to the bracket 2 by a central bolt 4. In the bottom face of said base-plate is a radial channel 5, which receives the edge of one part of the bracket 2, thereby preventing the base-plate from turning on the central bolt.

Rising from the upper surface of the base-plate 3 is a central, cone-shaped bearing 6, through the axis of which the bolt 4 passes. On this bearing and resting against the face of the base-plate is a circular casting 7, having a peripheral flange 8, which extends over an arc of one hundred and eighty degrees, or thereabout. Said casting is of less diameter than the base-plate, and upon the flat face of the latter is rigidly mounted a lug 9, having a projecting portion 10, which lies upon the flange 8 and holds the casting closely against the face of the base-plate while it permits the casting to turn on its conical bearing 6, to the full extent of its peripheral flange 8. In the edge of the casting at diametrically opposite points adjacent to the ends of said flange, are formed notches, or recesses 12, and upon the bracket 2 is arranged a sliding bolt or detent 13, having a squared end adapted to fit in said notches. The end of the squared portion is shouldered and provided with a rounded shank 14, on which is coiled a spring 15, one end bearing against the shoulder and the other against a staple, or keeper 16. A slender rod, or wire, 17 is connected to the end of the shank 14 and to a lever 18, fulcrumed on a bracket 19 in convenient proximity to the seat 20, occupied by the driver. By throwing this lever over, the bolt, or detent 13, is withdrawn from the notch 12 in the edge of the casting, and the latter is then free to turn. When the lever 18 is released, the tension of the spring 15 presses the bolt 13 against the edge of the casting and throws it into one of the recesses 12, when the casting has turned far enough to bring the said notch into proper position. As the parts described are in duplicate, each end of the rake being similarly equipped, the two rods, or wires 17 are connected to the lever 18 above and below its fulcrum, so that a single movement of the lever releases both bolts 13 from the casting 7 simultaneously.

In the upper face of the casting 7 is formed a diametrical channel 21, and a short channel 22, arranged radially, and at a right angle to the channel 21, into which it opens. The latter channel is of a width and depth sufficient to enable it to receive the sweep 23, upon which the single-tree is mounted, while the channel 22 receives the end of the tongue 24. The single-tree is secured by two bolts 25, and the tongue by a single bolt 26.

The manner of operating the attachment is as follows: The horses being attached to the rake one at each end, with the tongues in substantial parallelism with the teeth and locked in position by the spring-actuated bolts 13, the rake is operated in the usual manner until its teeth have gathered a suitable quantity of hay. The horses are then stopped, the lever 18 is operated to release the bolts 13 from their recesses in the edges of the castings, and the horses are simply turned in opposite directions until they are headed directly toward the rear. The castings 7 turning with the tongues while the rake and base-plates 3 remain stationary, the bolts 13 engage the other recesses 12 and lock the tongues, when they reach the reversed position. The horses being now started, the rake is readily drawn out from beneath the hay, and may be taken to any place, or drawn for any distance in a similar manner.

It will be noted that the few and simple parts constituting our invention form no part of the rake, proper, but are an attachment thereof, capable of being readily applied to any ordinary form of rake. This application may be made by any person possessing ordinary tools and having merely average mechanical skill.

The seat 27 is mounted on a steel spring, or brace 28, attached to, or forming part of a bearing 29 which swivels on a conical bearing 30, rising centrally from a base-piece 31, which is rigidly mounted on the center of the rake-frame. A bolt 32 passes through the cone-bearing and rises far enough above the same to receive a nut, or, if preferred, the head of the bolt may be above and a space will then be cut out of the wood under the bottom of the base-piece 31. The steel brace, or spring 28 is attached to the upper bearing 29, by means of bolts and is further secured in position by a cross-piece 34, which is secured to the bearing 29 and which lies at a right angle to the brace as more clearly shown in Fig. 4 of the drawings. This cross-piece also serves as a foot-rest. A large washer 35 is set in a countersunk recess in the top of the bearing 29 just under the steel brace and cross-piece, its upper face being flush with the bearing 29. The head of the bolt 32 rests on this washer. A circular foot-board 36 surrounds the base-piece 30 and is supported on the same part of the rake-frame, to afford a support and rest for the driver's feet in different positions of the seat and to enable him to revolve the latter without rising. When the construction of the rake-frame makes it necessary, cross-pieces may be set in, or upon, the timbers to support this foot-board.

One valuable advantage of the present invention is to enable us to bring the hay up to the stacker, turn the horses, and draw the rake from beneath the hay which is left upon the stacker ready to be lifted. By simply providing the stacker with two operating ropes and pulleys, instead of one, we may utilize the retrograde movement of the rake to operate the stacker, and thus avoid the necessity of providing a horse especially for that purpose. When operating upon this plan, the driver of the rake, after turning his horses, will simply attach the ropes of the stacker to a convenient part of the rake frame, and as the rake is drawn out from beneath the hay, the stacker raises the latter and deposits it on the stack. The rake may pass, if necessary, over any hay that is down, without difficulty, whereas, without our invention, long detours would frequently be necessary to avoid such hay.

What we claim is—

1. An attachment for a horse-rake, comprising attachable base-plates having central bearings plates swiveled on said bearings and provided with channeled seats for the ends of the tongues and for sweeps supporting the single-trees, and spring-actuated means for locking said plates in two positions, substantially as described.

2. An attachment for horse-rakes, comprising base-plates attachable to the ends of the rake-frame and having channels in their lower faces to receive the support to which they are rigidly secured, castings mounted on central bearings rising from said base-plates and having semi-peripheral flanges confined by lugs mounted on the base-plates the upper faces of said castings being provided with diametrical and radial channeled seats for the sweeps and tongues respectively, spring-actuated bolts adapted to engage recesses in the castings and a lever having a connection above and below its fulcrum to operate said bolts, substantially as described.

3. A horse-rake having an attachment consisting of base-plates, castings mounted on central, cone-shaped bearings rising from the base-plates, tongues and sweeps carrying the single-trees set in channeled seats in the upper faces of the castings, spring-actuated devices locking the castings in two positions, a lever to operate the same, and a central revoluble seat for the driver, substantially as described.

4. A horse-rake having its tongues and single-trees supported upon swiveled castings at the ends of the rake-frame, means for automatically locking the castings, a lever connected to the locking devices at points above and below its fulcrum and a seat for the driver swiveled upon a base-piece surrounded by a foot-board and arranged centrally between said tongues, substantially as described.

5. A horse-rake having tongues and double-trees supported upon castings swiveled upon attachable and detachable base-plates adapted to be rigidly secured to the ends of the rake-frame, spring-thrown bolts engaging recesses in the castings, a lever to withdraw said bolts and a seat for the driver between the ends of the rake swiveled upon an attachable and detachable base surrounded by a foot-board, substantially as described.

6. A horse-rake having reversible, swiveled tongues at the ends of the rake, and a central driver's seat supported by a bearing swiveled on a base-piece attachable to and detachable from the rake-frame, and a circular foot-board surrounding said base-piece, substantially as described.

In testimony whereof we have hereunto set our hands and affixed our seals in presence of two subscribing witnesses.

GEORGE N. CARAWAY. [L. S.]
OLE M. J. RAMSEY. [L. S.]

Witnesses:
W. H. McCLUNG,
E. S. LANKFORD.